United States Patent
Banda et al.

(10) Patent No.: US 10,904,092 B2
(45) Date of Patent: Jan. 26, 2021

(54) POLYMORPHIC VIRTUALIZED NETWORK FUNCTION

(71) Applicant: NOKIA SOLUTIONS AND NETWORKS OY, Espoo (FI)

(72) Inventors: Rajesh Banda, Bangalore (IN); Parijat Bhattacharjee, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/340,523

(22) PCT Filed: Oct. 10, 2016

(86) PCT No.: PCT/EP2016/074203
§ 371 (c)(1),
(2) Date: Apr. 9, 2019

(87) PCT Pub. No.: WO2018/068815
PCT Pub. Date: Apr. 19, 2018

(65) Prior Publication Data
US 2019/0245750 A1  Aug. 8, 2019

(51) Int. Cl.
*H04L 12/24* (2006.01)
*G06F 9/455* (2018.01)
*H04L 12/911* (2013.01)

(52) U.S. Cl.
CPC ...... *H04L 41/0896* (2013.01); *G06F 9/45558* (2013.01); *H04L 41/0893* (2013.01); *H04L 47/70* (2013.01); *G06F 2009/45595* (2013.01)

(58) Field of Classification Search
CPC ........... G06F 9/45558; G06F 9/455; G06F 2009/45595; H04L 41/0893; H04L 41/0896; H04L 41/06; H04L 41/0806; H04L 41/0816; H04L 41/5009; H04L 41/5051; H04L 47/70; H04L 12/2878; H04L 45/02; H04L 45/306; G06Q 20/32
See application file for complete search history.

(56) References Cited

U.S. PATENT DOCUMENTS

| | | |
|---|---|---|
| 2016/0100330 A1 | 4/2016 | Broustis et al. |
| 2016/0127169 A1 | 5/2016 | Rosa De Sousa Teixeira et al. |

(Continued)

FOREIGN PATENT DOCUMENTS

EP   3 068 157 A1   9/2016

OTHER PUBLICATIONS

International Search Report and Written Opinion dated Apr. 5, 2017 corresponding to International Patent Application No. PCT/EP2016/074203.

(Continued)

*Primary Examiner* — Le H Luu
(74) *Attorney, Agent, or Firm* — Squire Patton Boggs (US) LLP

(57) ABSTRACT

There is provided a method comprising: causing, by a network element of a wireless network, an allocation of a first resource set to an entity comprising at least a first virtual network function and a second virtual network function, wherein at least a subset of the first resource set provides the first virtual network function, and wherein another subset of the allocated first resource set or a second resource set allocated to said entity provides resources for said second virtual network function.

20 Claims, 5 Drawing Sheets

(56) References Cited

U.S. PATENT DOCUMENTS

| | | | | |
|---|---|---|---|---|
| 2016/0269908 A1* | 9/2016 | Richards | ................ | G06Q 20/32 |
| 2016/0301579 A1* | 10/2016 | Djukic | ................ | H04L 41/5009 |
| 2016/0328252 A1* | 11/2016 | Singh | ..................... | G06F 9/455 |
| 2016/0335111 A1* | 11/2016 | Bruun | ................. | G06F 9/45558 |
| 2016/0353226 A1* | 12/2016 | Rao | ........................ | H04L 41/06 |
| 2017/0048110 A1* | 2/2017 | Wu | ......................... | H04L 45/02 |
| 2017/0086049 A1* | 3/2017 | Vrzic | .................... | H04L 45/306 |
| 2017/0279635 A1* | 9/2017 | Kerpez | ............... | H04L 12/2878 |
| 2018/0077080 A1* | 3/2018 | Gazier | ................ | H04L 41/5051 |
| 2018/0152347 A1* | 5/2018 | Dhandu | ............. | H04L 41/0843 |
| 2018/0225139 A1* | 8/2018 | Hahn | .................. | G06F 9/45558 |
| 2018/0309824 A1* | 10/2018 | Gkellas | .............. | H04L 41/0806 |

OTHER PUBLICATIONS

Jan. 27, 2020 Communication pursuant to Article 94(3) EPC issued in European Patent Application No. 16781095.1.

* cited by examiner

POLYMORPHIC VIRTUALIZED NETWORK FUNCTION

TECHNICAL FIELD

The invention relates to communications.

BACKGROUND

In a wireless network, resource allocation may play a critical part in providing functionality for user devices. One way to reduce limitations of physical hardware may be to provide virtualized network functions which may utilize resources from one or more physical entities of the wireless networks. However, there may be limitations how resources are allocated to the virtualized network functions which may limit obtaining full potential of the virtualized network functions.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

Figure 1:
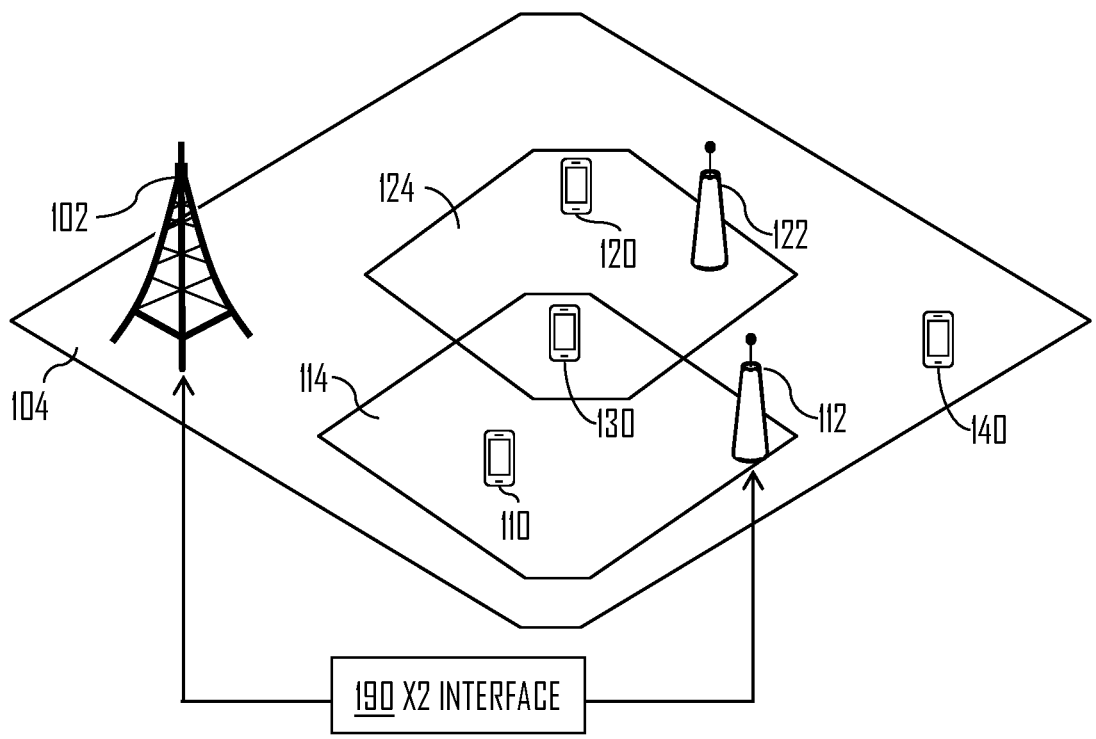
FIG. 1 illustrates an example wireless communication system to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced.

The embodiments are not, however, restricted to the system given as an example but a person skilled in the art may apply the solution to other communication systems provided with necessary properties. Another example of a suitable communications system is the 5G concept. 5G is likely to use multiple input-multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also it may be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE. Some of the functions of the LTE may even be non-existent in the 5G system. Some other technology advancements probably to be used are Software-Defined Networking (SDN), Big Data, and all-IP, which may change the way networks are being constructed and managed.

FIG. 1 illustrates example of a radio system (also referred to as a cellular communication system or cellular system) to which embodiments of the invention may be applied. Radio communication networks or wireless communication networks, such as the Wireless Local Area Network (WLAN, or WiFi) the Long Term Evolution (LTE), the LTE-Advanced (LTE-A) of the 3$^{rd}$ Generation Partnership Project (3GPP), or the predicted future 5G solutions, are typically composed of at least one network element, such as a network element 102, providing a cell 104. In the example of FIG. 1, cells 104, 114, 124 may be shown. The cell 114 may be provided by a network element 112, and the cell 124 may be provided by a network element 122, for example. The cell 104 may be provided by the network element 102. It is, however, possible that a network element of the radio system may provide more than one cell. Thus, for example, the network element 102 may provide the cell 104, the cell 114, and/or the cell 124. In general, the system may comprise one or more network elements (similar to those described with reference to FIG. 1), wherein each network element provides one or more cells providing service to one or more terminal devices in the cells.

Each cell of the radio communication network may be, e.g., a macro cell, a micro cell, a femto, or a pico-cell, for example, meaning that there may be one or more of each of the described cells. Each network element of the radio communication network, such as the network elements 102, 112, 122, may be an evolved Node B (eNB) as in the LTE and LTE-A, a radio network controller (RNC) as in the UMTS, a base station controller (BSC) as in the GSM/GERAN, Access Point (AP), or any other apparatus capable of controlling radio communication and managing radio resources within a cell. That is, there may be one or more of each of the described apparatuses or entities. To give couple of examples, the network element 102 may be an eNB, for example. The network element 112 may also be an eNB. For example, network element 102 may provide a macro cell and the network element 112 may provide a micro cell.

For 5G solutions, the implementation may be similar to LTE-A, as described above. The network elements 102, 112, 122 may be base station(s) or a small base station(s), for example. In the case of multiple eNBs in the communication network, the eNBs may be connected to each other with an X2 interface 190 as specified in the LTE. Example of this may be shown in FIG. 1, wherein the network element 112 may be shown to be connected to the network element 102 via the X2 interface 190. Other communication methods between the network elements may also be possible. For example, APs of WLAN system may communicate with each other. At least some of the network elements 102, 112, 122 may be further connected via an S1 interface to an evolved packet core, more specifically to a mobility management entity (MME) and to a system architecture evolution gateway (SAE-GW). So in general, the network elements of FIG. 1 may be communicatively connected (wireless and/or wired) to each other using one or more circuitries. The X2 interface 190 is one example of how to realize such communication.

The cells 114, 124 may also be referred to as sub-cells or local area cells, for example. The network elements 112, 122 may be referred to as sub-network elements or local area access nodes, for example. The cell 104 may be referred also to as a macro cell, for example. The network element 102 may be referred to as a macro network element, for example. In an embodiment, the local area access nodes are network elements similar to the network element 102. Thus, for example, the local area access node 112 may be an eNB or a macro eNB.

The cells 104, 114, 124 may provide service for at least one terminal device 110, 120, 130, 140, wherein the at least one terminal device 110, 120, 130, 140 may be located within or comprised in at least one of the cells 104, 114, 124. The at least one terminal device 110, 120, 130, 140 may communicate with the network elements 102, 112, 122 using communication link(s), which may be understood as communication link(s) for end-to-end communication, wherein source device transmits data to the destination device. It needs to be understood that the cells 104, 114, 124 may provide service for a certain area, and thus the at least one terminal device 110, 120, 130, 140 may need to be within said area in order to be able to use said service (horizontally and/or vertically). For example, a third terminal device 130 may be able to use service provided by the cells 104, 114, 124. On the other hand, fourth terminal device 140 may be able to use only service of the cell 104, for example.

The cells 104, 114, 124 may be at least partially overlapping with each other. Thus, the at least one terminal device 110, 120, 130, 140 may be enable to use service of more than one cell at a time. For example, the sub-cells 114, 124 may be small cells that are associated with the macro cell 104. This may mean that the network element 102 (e.g. macro network element 102) may at least partially control the network elements 112, 122 (e.g. local area access nodes). For example, the macro network element 102 may cause the local area access nodes 112, 122 to transmit data to the at least one terminal device 110, 120, 130, 140. It may also be possible to receive data, by the network element 102, from the at least one terminal device 110, 120, 130, 140 via the network elements 112, 122. To further explain the scenario, the cells 114, 124 may be at least partially within the cell 104.

In an embodiment, the at least one terminal device 110, 120, 130, 140 is able to communicate with other similar devices via the network element 102 and/or the local area access nodes 112, 122. For example, a first terminal device 110 may transmit data via the network element 102 to a third terminal device 130. The other devices may be within the cell 104 and/or may be within other cells provided by other network elements. The at least one terminal device 110, 120, 130, 140 may be stationary or on the move.

The at least one terminal device 110, 120, 130, 140 may comprise mobile phones, smart phones, tablet computers, laptops and other devices used for user communication with the radio communication network. These devices may provide further functionality compared to the MTC schema, such as communication link for voice, video and/or data transfer. However, it needs to be understood that the at least one terminal device 110, 120, 130, 140 may also comprise Machine Type Communication (MTC) capable devices, such as sensor devices, e.g. providing position, acceleration and/or temperature information to name a few examples.

Figure 2:
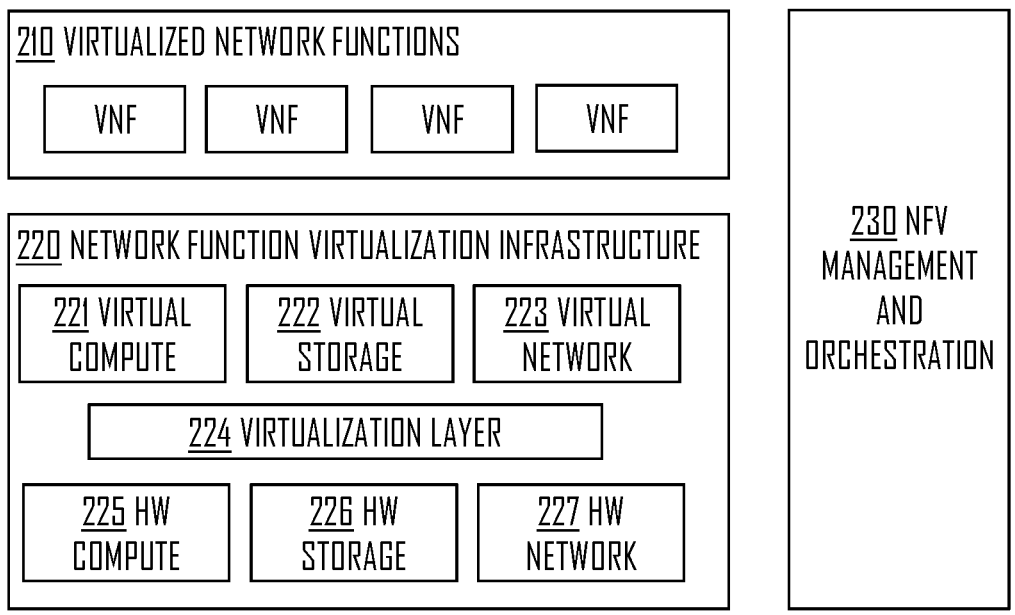
FIG. 2 illustrates an example of virtualized network functions to which embodiments of the invention may be applied.

The radio system of FIG. 1 may be configured to provide one or more VNFs 210 as shown in the example of FIG. 2. This may mean that at least some of the functions provided by the radio system are virtualized. It may be that some functions are provided directly by physical entities and some are virtualized or that all network functions are virtualized. Examples of VNFs may comprise firewall function, antivirus function, video optimizer function, parental control function, router function, Internet Protocol Security (IPS), Radio Network Controller (RNC), or Evolved Packet Core (EPC), to name only a few examples. In general, if for example a router function is normally provided by physical entity, it may be virtualized and thus the router function may become a VNF, i.e. router VNF.

Referring to FIG. 2, the virtualization may work such that physical hardware resources 225-227 comprising one or more hardware computing entities (e.g. processors, servers), one or more hardware storages (e.g. databases) and one or more hardware network resources (e.g. radio interfaces, wiring) are virtualized via virtualization layer 224. The virtualization layer 224 may be responsible of abstracting the physical resources provided by the hardware layer 225-227 into virtual resources 221-223. The VNFs 210 may utilize the virtual resources 221-223 to provide needed functionalities. Virtualization provides benefits, for example, as the virtual resources 221-223 may be scaled using the hardware resources 225-227. For example, more hardware resources may be dynamically allocated for the virtual entities if a need arises. Similarly, hardware resources may be used for some other purpose when, for example, network load is lower.

The virtualization of network functions may also utilize a specific NFV management and orchestration entity 230 that may be responsible for controlling the VNFs 210. For example, the NFV management and orchestration entity 230 may create VNFs or control how different VNFs work. Further the NFV management and orchestration entity 230 may control the virtualization of the hardware resources 225-227 into the virtual resources 221-223 via the virtualization layer 224. Thus, for example, the NFV management and orchestration entity 230 may allocate further hardware resources 225-227 to the virtual layer 221-223 if needed and available.

As the implementation of network functions moves towards VNFs, there may be a need to introduce new features that enable the wireless network to be even more flexible and/or reliable. However, these topics are not generally discussed in the art of virtualization of network functions. In fact, striving towards even more flexible wireless network structure with VNFs may cause degradation of reliability. Therefore, there is provided a solution providing an enhanced VNF (eVNF). eVNF may, for example, decrease starting time of a VNF compared with the existing solutions.

Figure 3:
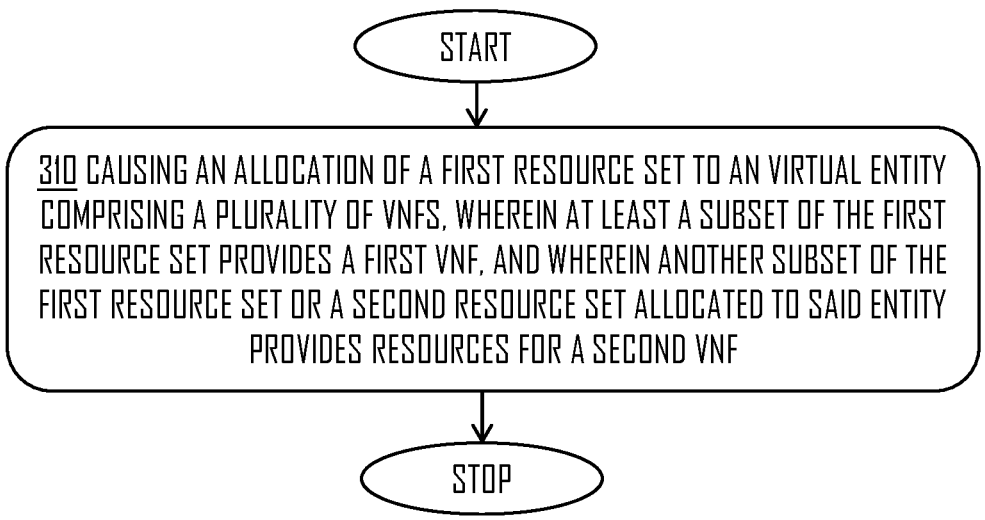
FIG. 3 illustrates a block diagram according to an embodiment.

FIG. 3 illustrates a flow diagram according to an embodiment. Referring to FIG. 3, a network element of a wireless network may cause an allocation of a first resource set to an entity comprising at least a first virtual network function and a second virtual network function, wherein at least a subset of the first resource set provides the first virtual network function, and wherein another subset of the allocated first resource set or a second resource set allocated to said entity provides resources for said second virtual network function (block 310). In an embodiment, the entity further comprises a virtual control function for controlling virtual network functions (e.g. the first and second virtual network functions) of said entity.

The network element performing the step 310 may be a part of the wireless network or a part of a wireless communication system, such as the system shown in FIG. 1. For example, said network element may be the network element 102 or comprised in the network element 102. For example, said network element may be a controller circuitry of the wireless network. In an embodiment, said network element is a virtual entity provided by the NFV Infrastructure (NFVI) 220.

According to an aspect, there is provided an entity comprising at least a first virtual network function and a second virtual network function, wherein at least a subset of a first resource set provides the first virtual network function, and wherein another subset of the allocated first resource set or a second resource set allocated to said entity provides resources for said second virtual network function, wherein the first resource set is allocated to said entity.

The entity discussed with reference to FIG. 3 may also be called as eVNF. The eVNF may comprise a plurality of VNF, and thus may not be limited to only first and second VNFs. Allocating a resource set to the eVNF may bring some benefits. For example, starting a VNF may become faster compared to a known solutions as the resources for providing said VNF may already be allocated (i.e. available) to the eVNF. In some embodiments, said entity is referred to as a logical entity or a logical virtual entity. That is, said entity may be an entity of a virtual system, wherein it may be configured to operate as a logical entity. The logical entity may provide functionality similar to functionality provided by one or more physical entities.

Figure 4A:
FIGS. 4A to 4E illustrate some embodiments.

Let us look closer on said entity (e.g. eVNF) with reference to an embodiment of FIG. 4A. The eVNF may comprise a plurality of VNFs 414-418. In an embodiment, the eVNF comprises a controller entity or a controller 412 for controlling the plurality of VNFs 414-418. For example, the controller 412 may be configured to communicate with the network element performing the steps of FIG. 3 and/or with the NFV management and orchestration entity 230. Thus, the controller 412 may receive control messages external to the eVNF 410 and may further be able to control the VNFs 414-418 according to the control messages or on the basis of said control messages. For example, the controller 412 may cause activation or deactivation of a VNF 414-418. Thus, the network element performing the steps of FIG. 3 may control the VNFs 414-418 via the controller 412 and/or the controller 412 may control the VNFs 414-418 independently, for example, based on requests from the NFV management and orchestration entity 230.

Figure 4B:
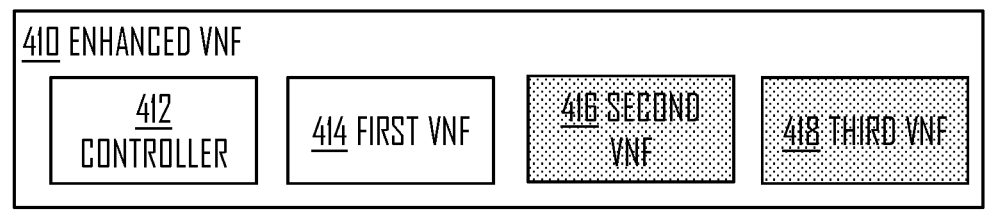

In an embodiment, one of the first virtual network function 414 and the second virtual network function 416 is active and the other is inactive. For example, referring to FIG. 4B, the second VNF 416 may be inactive. Inactiveness may mean that the second VNF 416 is dormant or in sleep state. However, the resources (e.g. first resource set, second resource set) may be allocated to the eVNF 410, and thus the controller 412 may activate the inactive VNF 416 when a need arises. As the resources are available, the activation may happen faster than in the previous solutions that may require additional messaging between the NFV management and orchestration entity 230, the virtual resources 221-223 and the hardware resources 225-227. In an embodiment, the allocated first and/or second resources are virtual resources provided by the virtual entities 221-223.

Thus, utilizing the proposed solution, Mean Time To Recover (MTTR) of an VNF may be reduced. The inactive VNF may mean said VNF is dormant, i.e. running or at least existing, but not performing the functionality of said VNF. Further, as the active and inactive VNFs may be comprised and existing in the same virtual entity 410, controlling of the VNFs may be less complex. That is, VNF does not need to be established each time said VNF is needed, but it may be put to inactive state and activated once the need again rises. However, the solution does not limit creating and/or deleting VNFs within an eVNF or creating and/or deleting eVNFs.

In an embodiment, said allocated first resource set and/or said allocated second resource set are reserved only for said entity (e.g. eVNF 410). Reservation means that the resources are not necessarily used. That is, the radio resource may be used when one or more VNFs are activated. How much or what portion of the resources are used naturally depends on how many VNFs 414-418 of the eVNF 410 are active.

Figure 4C:
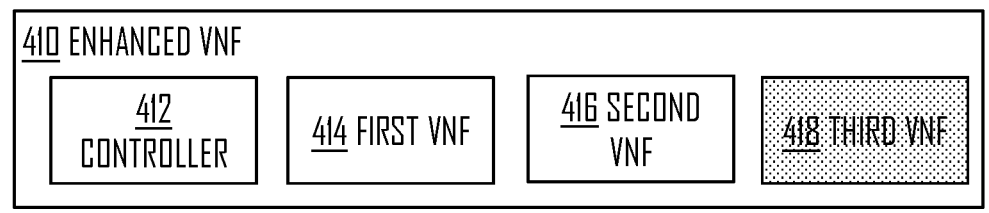

In an embodiment, the network element performing the steps of FIG. 3 is further configured to cause an activation of the first virtual network function 414 and/or the second virtual network function 416. Example of this may be seen in FIGS. 4B and 4C, wherein the inactive second VNF 416 is first inactive (i.e. FIG. 4B) and then active (i.e. FIG. 4C).

It is clear to the skilled person that this functionality may be extended to cover more than two VNFs. Thus, for example, a third VNF 418 may be activated or deactivated similarly as the first and second VNFs 414, 416. Also, it needs to be noted that when the eVNF 410 is deployed or generated each VNF 414-418 may be inactive. Thus, each VNF 414-418 may be activated accordingly when a need arises.

In an embodiment, the network element performing the steps of FIG. 3 is further configured to cause the eVNF to change active VNF. That is, the eVNF may simultaneously provide one or more VNFs for which said network element may have allocated resources. Based on a control message, the eVNF, or more particularly, the controller 412 may change the active VNF(s). For example, if a firewall VNF is first provided by the eVNF, the controller may deactivate the firewall VNF and activate an antivirus VNF. As explained, in some embodiments these VNFs may run simultaneously. However, in some instances it may be beneficial to entirely change the VNF that is provided to some other VNF. Thus, the eVNF may be configured to provide one or more VNFs simultaneously or at different times. Therefore, the eVNF may, for example, provide a first set of VNFs and change the first set of VNFs to a second set of VNFs or provide both sets simultaneously depending on, for example, network load. Changing or reconfiguring a VNF (e.g. first VNF 414) to perform a different function may be referred to as polymorphism (e.g. first firewall VNF and after reconfiguring antivirus VNF). Similarly, changing active VNFs, increasing active VNFs or decreasing active VNFs within the eVNF 410 may, at least in some instances, be referred to as polymorphism. That is, the eVNF 410 may polymorph according to commands from the controller 412, wherein the commands may originate from the controller 412 or from some external virtual or physical entity. In general, an eVNF may support multiple VNFs (each VNF may have a different behavior). Polymorphism then may refer to the ability of the eVNF to dynamically respond to the changing conditions of a network by changing its own behavior. Thus, the polymorphism may denote changing behavior of the eVNF, such as which VNFs the eVNF provides at a time (based on, for example, gathered data from the network). Thus, an eVNF may, for example, morph from a eVNF providing only firewall function sinto an eVNF providing both firewall function and antivirus function.

In an embodiment, the network element performing the steps of FIG. 3 is further configured to cause an activation of an inactive virtual network function. For example, the second VNF 416 may be activated when the controller 412 determines that the second VNF 416 is needed. Again it is noted that the controller 412 may control the VNFs 414-418 based on external commands or request, for example, from said network element or from the NFV management and orchestration entity 230. It is later explained in more detail how this functionality may be obtained in the NFV management and orchestration entity 230.

The controller 412 of the eVNF 410 may further provide an interface to external virtual and/or physical entities. That is, the controller 412 may be configured to control the eVNF 410 according to an Application Programming Interface (API). Some examples of the API may include:

serviceWakeup( )
    API that implements loading and activating a VNF
serviceSleep( )
    The service is deactivated or made dormant when not needed
startup( )
    Startup the eVNF
    Possibly initiates the allocation of radio resources
shutdown( )
    Complete shutdown of the eVNF and release of resources
triggerNotification( )
    May be used to control notifications provided by the eVNF, e.g. provide notification when a VNF is activated or inactivated
serviceCapababilities( )
    eVNF may list VNFs that it is able to provide, e.g. with the given resources
pluginExtService( )
    Enables plugin of external VNFs, e.g. VNFs that are not yet provided by the eVNF.

The described API may be understood as an example, and thus other API(s) or commands may be also be used. The API may be used to command the controller 412, by an external device (e.g. network element performing steps of FIG. 3), to perform one or more actions relating to the eVNF 410 (e.g. activation, deactivation of one or more VNFs within the eVNF).

Figure 4D:
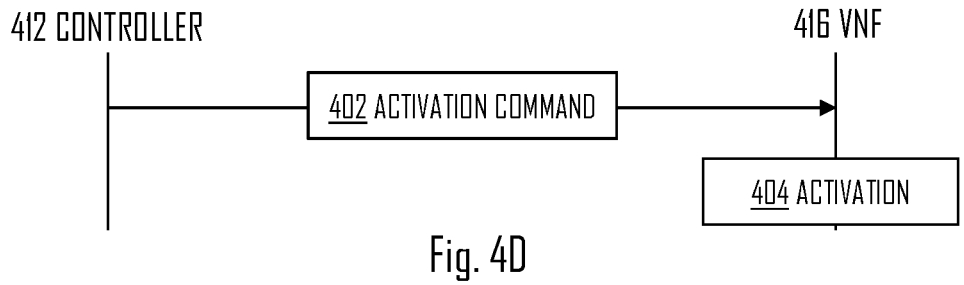
Figure 4E:

FIGS. 4D to 4E illustrate signal diagrams according to some embodiments. Referring to FIGS. 4D and 4E, the controller 412 may be configured to transmit a control message to one or more VNFs 414-418 of the eVNF 410. For example, the control message may be transmitted to the VNF 416. The control message may comprise, for example, an activation command (block 402) that causes activation of the VNF 416 (block 404). Similarly, the control message may comprise, for example, a deactivation command (block 412) that causes deactivation of the VNF 416 (block 414). For example, the VNF may be in sleep mode (i.e. not active). The controller 412 may determine that the VNF 416 needs to be activated. This determination may be based on network load or a specific request from some external entity (e.g. entity 230), for example. Thus, the activation command may be transmitted and the VNF 416 may activate accordingly. Similar determination may be the basis for deactivation. However, in that case the determination may be that the VNF 416 does not need to be active. Similar activation or deactivation commands may be transmitted to any VNF 414-418 of the eVNF 410 based on individual or group determination. That is, it may individually be determined, by the controller 412, whether or not a specific VNF is needed or not, or it may be determined that some number of active VNFs are needed, for example, in the case that the VNFs provide same functionality. For example, if two VNFs provide firewall functionality, one or both may be activated by the controller 412 when a need arises.

Figure 5A:
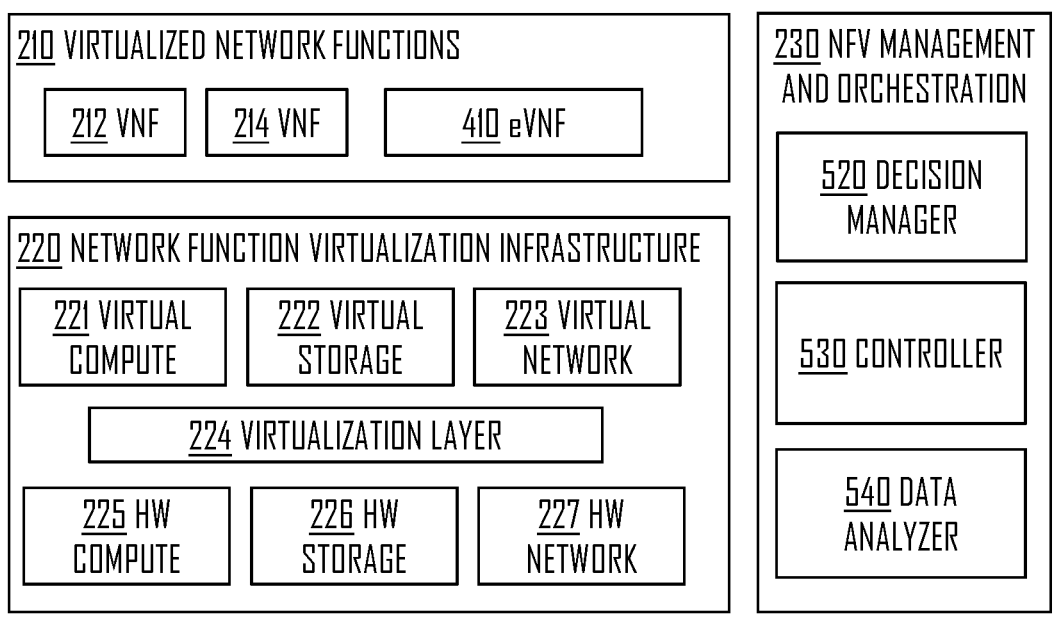
FIGS. 5A to 5C illustrate some embodiments.

FIG. 5A illustrates a block diagram according to an embodiment. Referring to FIG. 5A, the eVNF 410 may be one of a plurality of eVNFs and/or VNFs. That is, there may be one or more regular VNFs 212, 214 and/or one or more eVNFs 410 in the system. This may enable the eVNF 410 to be compatible with legacy systems and with future systems. As with eVNF 410, each eVNF of the system may comprise a plurality of VNFs or may be capable of providing a plurality of VNFs.

In an embodiment, the NFV management and orchestration entity 230 comprises a decision manager 520, a controller 530, and/or a data analyzer 540.

Data analyzer 540 (e.g. data analyzer engine) may be configured to collect data from the wireless network (e.g. wireless network of FIG. 1). The data may be processed according to correlation rules, wherein the correlation rules may be predetermined or configurable. The data analyzer 540 may store the collected data. This may enable validation of the collected data to historic data. Thus, the data analyzer 540 may determine integrity and/or validity of the collected data. The data analyzer 540 may determine Key Performance Indicator(s), such as MTTR, based on the collected data, wherein the KPIs may indicate performance of the eVNF 410 or VNFs of the eVNF, for example. Other KPI examples may include overall eVNF load, load on individual active instances within an eVNF (e.g. VNFs of the eVNF), domain related KPIs such as network utilization, or quality parameters such as jitter, latency of the service being provided.

The controller 530 may be configured to control the data analyzer 540 and/or the decision manager 520. It may supervise processes of the NFV layer and configure correlation rules, for example. It may further process data from the data analyzer 540 and prepare reports to the decision manager 520. The controller 530 may be configured to perform decisions based on data from the data analyzer.

The decision manager 520 may be configured to perform domain and/or service level decision. Rules for decisions may be predetermined or configurable by a user. Further, the decision manager 520 may cause transmission of control message to the controller 412 (or some other controller) of the eVNF 410. Thus, the decision manager 520 may cause, for example, activation or deactivation of a VNF of the eVNF 410 by transmitting a control message to a controller of an eVNF (e.g. controller 412 of the eVNF 410).

In addition, the decision manager 520 may have rules such as:

Scope of behavior change (e.g. Type A may support variants A1, A2 and A3). That is, since an eVNF may support multiple VNFs (each VNF may have a different behavior), rules may need to be specified that indicate the set of VNFs supported by a particular eVNF type. That is, the decision manager 520 may obtain information or data about the eVNF 410 indicating what VNFs the eVNF may support. Thus, it may request the controller 412 to provide some needed function, wherein the needed function is determined to be provided on the basis of said information or data about the eVNF 410.

Scope in terms of domain. Type A could be within 2G, for example. That is, the decision manager 520 may be configured to support VNFs or eVNF(s) for one or more Radio Access Technologies (RATs). For example, one VNF of the eVNF may be for 2G and one may be for LTE cellular communication. For example, one eVNF may be for 5G and one may be for LTE. For example, the decision manager 520 may generate an eVNF for supporting 5G functions and/or 2G functions.

Rules for self-service—ensuring that the framework itself stays up and scales. The decision manager 520 may have rules enabling it to support behaviors of the current VNFs in the eVNF.

Group elements with related behaviors. The decision manager could have rules that allow eVNFs to be created such that the set of VNFs supported have similar behaviors or similar requirements/constraints such as latency. There could be rules that allow for network slicing as well.

Group elements by related domain constraints such as latency, need for specialized processing Architecture rules. The decision manager 520 may comprise rules enabling the decision manager 520 to generate VNFs and/or eVNFs. Further, the rules may enable the decision manager 520 to generate, at least partially, the virtualized system of FIG. 5A, for example.

In an embodiment, the decision manager 520, the controller 530, and/or the data analyzer are comprised in a smart layer. The smart layer may be comprised in one or more physical entities. The smart layer may be virtualized, e.g. centrally (i.e. logically same virtual entity) or separately (i.e. logically different virtual entities communicatively connected to each other). The smart layer may be configured to obtain data about the one or more VNFs 212, 214 and/or one or more eVNFs 410 (including the VNFs within the eVNFs), process said data and control said one or more VNFs 212, 214 and/or one or more eVNFs 410 based on the processed data. For example, eVNFs or VNFs may be generated or deleted and/or activated or deactivated based on network needs (e.g. determination based on the processed data). Further, the smart layer (i.e. smart layer entity or smart layer entities) may be configured to request or allocate resources for the NFVI 220.

In an embodiment, the eVNF 410 is configured to support network slicing.

Figure 5B:
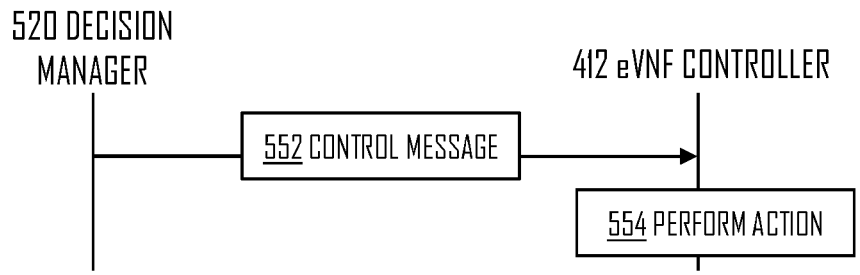

In an embodiment, with reference to FIG. 5B, the network element performing steps of FIG. 3 is configured to cause a transmission of a control message (552) to the virtual control function (e.g. controller 412) of the eVNF, the control message causing the virtual control function to perform (block 554) at least one of activating the first virtual network function, activating the second virtual network function, deactivating the first virtual network function, deactivating the second virtual network function. In general, the controller 412 may be used to control a plurality of VNFs of the eVNF 410, and the controller 412 may, based on the control message, at least activate or deactivate a VNF among said plurality of VNFs of the eVNF 410. That is, for example, the decision manager 520 may transmit a control message to the eVNF controller 412, wherein the controller 412 may perform an action based on the control message. For example, the controller 412 may perform actions described above and/or described with reference to FIGS. 4D to 4E. For example, if the decision manager 520 determines, based on network load, that a specific VNF or VNFs needs to be activated, the decision manager 520 may transmit a control message to the controller 412 requesting activation of said VNF(s). For example, the determination by the decision manager 520 may be based on the reports received from the controller 530, wherein the reports are based on the data collected by the data analyzer 540.

Figure 5C:
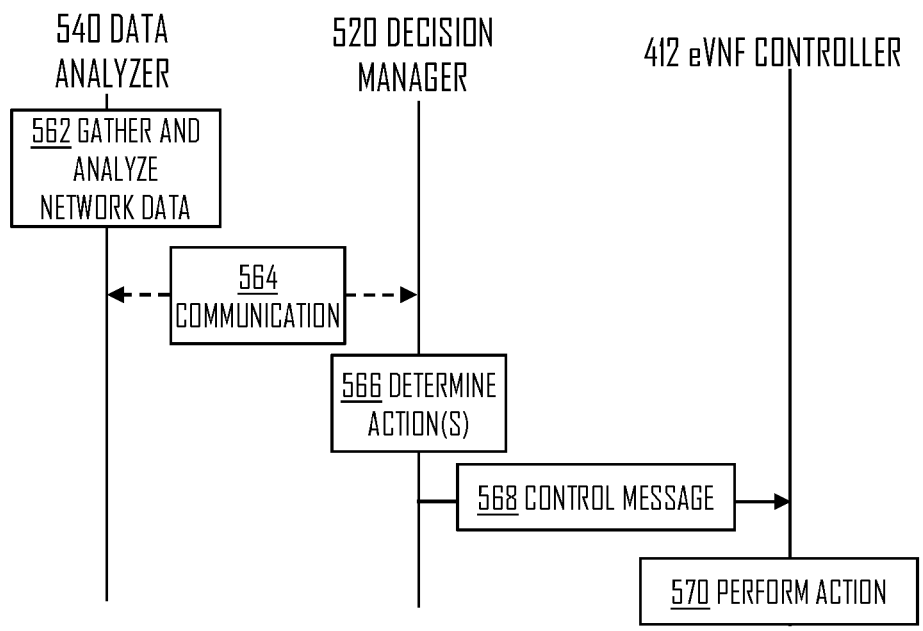

Referring to embodiment of FIG. 5C, in block 562 the data analyzer 540 may gather and/or analyze network data of the wireless network. The data analyzer 540 and the decision manager 520 may communicate with each other (block 564). The communication may happen directly or via the controller 530, for example. The communication may comprise transmitting a report comprising at least some gathered and/or analyzed data and/or Key Performance Indicators (KPIs) (such as MTTR, overall eVNF load, load on individual active instances within an eVNF, domain related KPIs such as network utilization, or quality parameters such as jitter, latency of the service being provided) by the data analyzer 540. In block 566, the decision manager 520 may determine action(s) to be performed based on the received report. In block 568, if an action is determined to be needed, the decision manager 520 may transmit a control message to the controller 412. The controller 412 may perform an action, such as activation or deactivation of a VNF, based on the control message (block 570). Control message(s) may be transmitted, by the decision manager 520, to one or more eVNF controllers. For example, if antivirus VNF is located in a first eVNF and the decision manager 520 determines that antivirus VNF is needed, a control message comprising an activation command may be transmitted to a controller of the first eVNF. For example, if firewall VNF is located in a second eVNF and the decision manager 520 determines that firewall VNF is needed, a control message comprising an activation command may be transmitted to a controller of the second eVNF. Similar logic may apply to each VNF situated at any eVNF of the wireless network.

In some embodiments, the control message(s) transmitted by the decision manager 520 are transmitted by some other entity of the entity 230. For example, an orchestrator of the element 230 may perform transmitting of said control message(s) to the eVNF controllers (e.g. controller 412).

Figure 6:
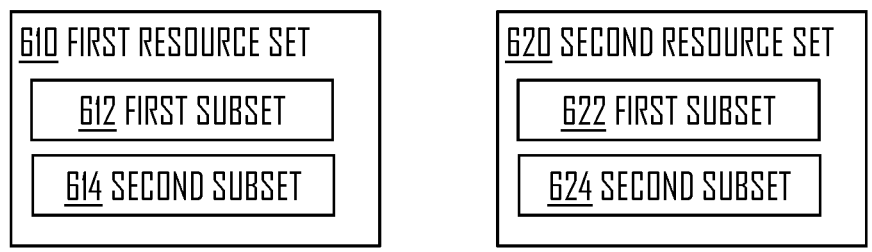
FIG. 6 illustrates a block diagram according to an embodiment.

FIG. 6 illustrates a block diagram according to an embodiment. Referring to FIG. 6, the network element performing steps of FIG. 3 is configured to cause an allocation of the first resource set 610 and/or the second resource set 620 to the eVNF 410. The resource sets may denote virtual computing resources, such as the virtual resources 221-223. In some instances, the first resource set 610 is the only resource set for the eVNF 410. However, in some instances both the first and second resource sets 610, 620 are allocated to the eVNF 410. It may be possible that further resource sets are allocated to the eVNF 410.

The resource sets 610, 620 may be used in many ways by the eVNF 410 to provide needed VNF(s). For example, a first subset 612 of the first resource set 610 may be used to provide resources for the first VNF 414 and a second subset 614 may be used to provide resources for the second VNF 416. Thus, when one of the VNFs 414, 416 is inactive, the respective resources may not be used (but are still reserved and available). Thus, when a need arises and the controller activates an inactive VNF (e.g. 414 and/or 416), the transition of the VNF to active state may be quite fast compared with the existing solutions. I.e. MTTR may be quite low. It needs to be noted that only one resource set may be used to provide resources for one or more VNFs. That is, a subset 612 may be used to provide resources for the first VNF 414 and after that to the VNF 416. That is, the allocated resources 610 may be used freely by the eVNF 410 to provide needed resources.

In an embodiment, the network element performing steps of FIG. 3 is configured to cause an allocation of the second resource set 620 to the eVNF 410. The second resource set 620 may be used to provide the second VNF 416 and the first resource set 610 may be used to provide the first VNF 414. The second resource set 610 may comprise a plurality of subsets 622, 624, for example. The first and/or the second resource sets 610, 620 may be configured to provide a plurality of VNFs.

In general, the controller 412 may cause an activation of a requested VNF of the eVNF 410 if there are resources available from allocated resource set(s). However, if the controller 412 determines that there are not enough resources available, it may send a resource request message. The resource request message may be transmitted to the entity 230 (e.g. to the decision manager 520), wherein the entity 230 or the decision manager 520 may determine whether or not to give further resources to the eVNF 410. In an embodiment, the entity 230 or the decision manager 520 allocates further resources to the eVNF 410 when the resource request message is received. The entity 230 or the decision manager 520 may indicate the further resources accordingly to the eVNF 410. For example, the network element performing steps of FIG. 3 may first cause allocation of first resource set 610 to the eVNF 410 to provide a plurality of VNFs. If the controller 412 determines that the first resource set 610 is not enough, it may request further resources. Thus, the network element performing steps of FIG. 3 may further cause allocation of the second resource set 620 to the eVNF 410. Causing in this sense may mean that the said network element causes the decision manager 520 to be configured such that the further radio resources are allocated, for example.

In an embodiment, the second virtual network function 416 is provided by the second subset 614 of the allocated first resource set 610. The first VNF 414 may be provided by the first subset 612. There may be further subsets providing resources for further VNFs of the eVNF.

In an embodiment, the controller 412 determines that one or more VNFs 414-418 of the eVNF 410 is overloaded or down (i.e. unable to operate as there are, for example, insufficient resources). The controller 412 may then allocate resources allocated to the eVNF 410 such that the overloaded VNF(s) 414-418 may operate accordingly. For example, resources may be taken away from a VNF having a lower priority. In another example, resources may be given from non-used resources that are allocated to the eVNF 410. For example, some VNF of the eVNF 410 may have a higher priority than some other VNF of the eVNF 410. Thus, for example, when resources are scarce, the controller 412 may grant resources for VNFs having a higher priority. For example, antivirus may have a higher priority than video optimizer.

This method may be used to provide High Availability using Active-polymorphicActive (A-pA) configuration. In this configuration, resources may be reserved, but may dynamically be used by the eVNF depending on a use case. For example, an additional VNF may be activated utilizing the available resources if needed. The A-pA may enable the eVNF 410 to be polymorphic, meaning that the eVNF 410 may change VNFs it provides based on control commands from the controller 412. The MTTR may significantly reduce since the eVNF is a running system compared to starting a new VNF to offer services on a system failure. The efficient usages of resources mean that the resources allocated for the eNVF are shared in some functionalities/services on both time and space with other forms of VNF when multiple are active. For example, in service chaining, video optimizer VNF and antivirus VNF could have some resource shared as there could some functionalities/services in common. Even if they are not common, resources could still be shared in TIME aspect.

In an embodiment, the network element performing steps of FIG. 3 may further cause virtualization of a plurality of network functions 414-418, the virtual network functions being provided by one or more virtual machines 221-223; and cause association of at least the first and the second virtualized network functions 414-416 of the plurality of virtual network functions 414-418 into the eVNF 410. That is, said network element may cause the virtualized system of FIG. 5 to be established. After establishing, the virtual system may perform actions as described above. The virtual system may be a part of the wireless system of FIG. 1, for example.

Figure 7:
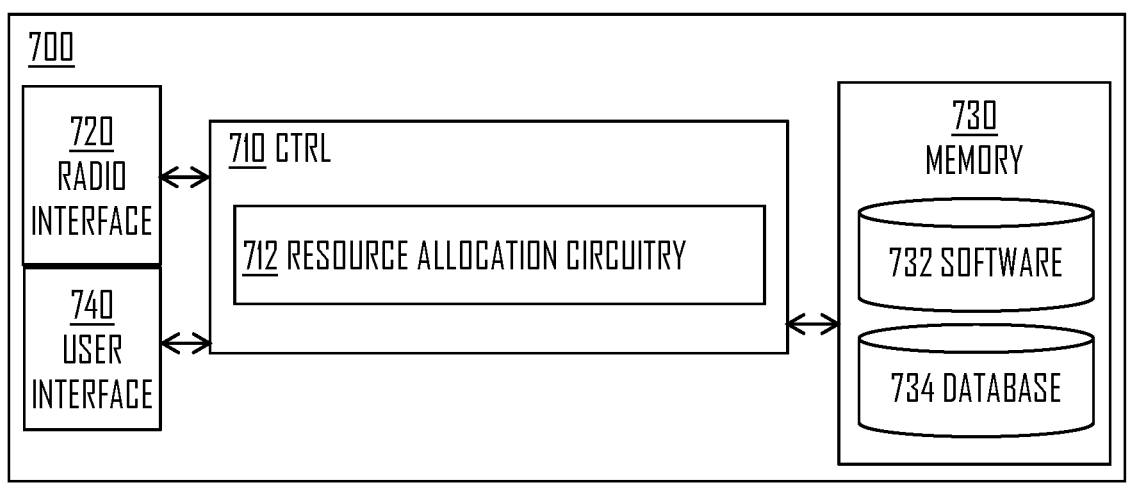
FIG. 7 illustrates a block diagram of an apparatus according to an embodiment.

FIG. 7 provides an apparatus 700 comprising a control circuitry (CTRL) 710 such as at least one processor, and at least one memory 730 including a computer program code (software) 732, wherein the at least one memory and the computer program code (software) 732, are configured, with the at least one processor, to cause the respective apparatus 700 to carry out any one of the embodiments or operations thereof.

Referring to FIG. 7, the memory 730 may be implemented using any suitable data storage technology, such as semiconductor based memory devices, flash memory, magnetic memory devices and systems, optical memory devices and systems, fixed memory and removable memory. The memory 730 may comprise a database 734 for storing data.

The apparatus 700 may further comprise radio interface (TRX) 720 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas.

The apparatus 700 may comprise user interface 740 comprising, for example, at least one keypad, a microphone, a touch display, a display, a speaker, etc. The user interface 740 may be used to control the respective apparatus by a user of the apparatus 740.

In an embodiment, the apparatus 700 may be or be comprised in a network device, such as a network node or AP, for example. The apparatus 700 may be the network element 102, for example. In an embodiment, the apparatus 700 is comprised in the network element 102 or in some other network element. Further, the apparatus 700 may be the network element performing the steps of FIG. 3, for example. The apparatus 700 may be configured to perform virtualization of the system (e.g. system of FIG. 5).

Referring to FIG. 7, the control circuitry 710 may comprise a resource allocation circuitry 712 configured to cause an allocation of a first resource set to an entity (e.g. eVNF) comprising at least a first virtual network function and a second virtual network function, wherein at least a subset of the first resource set provides the first virtual network function, and wherein another subset of the allocated first resource set or a second resource set allocated to said entity provides resources for said second virtual network function.

According to an aspect, there is provided a virtualized network system comprising one or more of the entities and/or elements of FIG. 5A. In some embodiments, said system may comprise all entities and/or elements of FIG. 5A.

According to an aspect, there is provided a system comprising: at least one server computer 225; at least one database 226; and at least one network 227, wherein the at least one server computer together with the at least one database via the at least one network are configured to provide a plurality of virtualized network functions, wherein at least a first and a second virtualized network functions of said plurality of virtualized network functions are grouped in an entity, the at least one server computer together with the at least one database via the at least one network further configured to allocate at least a first resource set to said entity, wherein at least a subset of the first resource set is configured to provide the first virtual network function, and wherein another subset of the allocated first resource set or a second resource set allocated to said entity is configured to provide resources for said second virtual network function. For example, the described system may further comprise further elements of the system of FIG. 5A.

It further needs to be noted that the virtual elements described above need not be situated in one physical entity. That is, the different operational entities (e.g. FIG. 5) may be comprised and/or provided by a plurality of physical entities. The virtualization, in general, means that location of actual computing becomes less relevant for the performance of the system. Therefore, the actual functions of the described system may be realized by physical entities. However, logically the virtual entities may operate similarly as physical entities. These aspects are clear for a skilled person, and thus not explained in further detail.

In an embodiment, the eVNF 410 is referred to as polymorphic VNF or a polymorphic eVNF.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation may be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it may be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but may be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept may be implemented in various ways. Further, it is clear to a person skilled in the art that the described embodiments may, but are not required to, be combined with other embodiments in various ways.

The invention claimed is:

1. A method comprising:
  causing, by a network element of a wireless network, an allocation of a first resource set to an entity comprising at least a first virtual network function, a second virtual network function and a virtual control function for controlling virtual network functions of said entity,
  wherein at least a subset of the first resource set provides the first virtual network function,
  and wherein another subset of the allocated first resource set or a second resource set allocated to said entity provides resources for said second virtual network function.

2. The method of claim 1, further comprising:
  causing an activation of the first virtual network function or the second virtual network function.

3. The method of claim 1, wherein one of the first virtual network function and the second virtual network function is active and the other is inactive.

4. The method of claim 3, further comprising:
  causing an activation of said inactive virtual network function.

5. The method of claim 1, further comprising:
  causing an allocation of the second resource set to said entity.

6. The method of claim 1, wherein the allocated first resource set or the allocated second resource set are reserved only for said entity.

7. The method of claim 1, wherein the activated second virtual network function is provided by said another subset of the allocated first resource set.

8. The method of claim 1, further comprising:
  causing a virtualization of a plurality of network functions, the virtual network functions being provided by one or more virtual machines; and
  causing association of at least the first and the second virtualized network functions of the plurality of virtual network functions into said entity.

9. The method of claim 1, the method further comprising:
  causing a transmission of a control message to the virtual control function, the control message causing the virtual control function to perform at least one of activating a virtual network function of said entity, deactivating a virtual network function of said entity.

10. An apparatus, comprising:
  at least one processor, and
  at least one memory comprising a computer program code, wherein the at least one memory and the computer program code are configured, with the at least one processor, to cause a network element of a wireless network to perform operations comprising:
  causing an allocation of a first resource set to an entity comprising at least a first virtual network function, a second virtual network function and a virtual control function for controlling virtual network functions of said entity,
  wherein at least a subset of the first resource set provides the first virtual network function,
  and wherein another subset of the allocated first resource set or a second resource set allocated to said entity provides resources for said second virtual network function.

11. The apparatus of claim 10, wherein the at least one memory and the computer program code are configured, with the at least one processor, to cause the network element further to perform operations comprising:
  causing an activation of the first virtual network function or the second virtual network function.

12. The apparatus of claim 10, wherein one of the first virtual network function and the second virtual network function is active and the other is inactive.

13. The apparatus of claim 12, wherein the at least one memory and the computer program code are configured, with the at least one processor, to cause the network element further to perform operations comprising:
  causing an activation of said inactive virtual network function.

14. The apparatus of claim 10, wherein the at least one memory and the computer program code are configured, with the at least one processor, to cause the network element further to perform operations comprising:
  causing an allocation of the second resource set to said entity.

15. The apparatus of claim 10, wherein the allocated first resource set or the allocated second resource set are reserved only for said entity.

16. The apparatus of claim 10, wherein the activated second virtual network function is provided by said another subset of the allocated first resource set.

17. The apparatus of claim 10, wherein the at least one memory and the computer program code are configured, with the at least one processor, to cause the network element further to perform operations comprising:
   causing a virtualization of a plurality of network functions, the virtual network functions being provided by one or more virtual machines; and
   causing association of at least the first and the second virtualized network functions of the plurality of virtual network functions into said entity.

18. The apparatus of claim 10, wherein the at least one memory and the computer program code are configured, with the at least one processor, to cause the network element further to perform operations comprising
   causing a transmission of a control message to the virtual control function, the control message causing the virtual control function to perform at least one of activating a virtual network function of said entity, deactivating a virtual network function of said entity.

19. The apparatus of claim 10, wherein said entity is one of a plurality of entities, each entity comprising at least one virtual network function.

20. A non-transitory computer-readable medium comprising program instructions for causing an apparatus to perform at least the following:
   causing, by a network element of a wireless network, an allocation of a first resource set to an entity comprising at least a first virtual network function, a second virtual network function and a virtual control function for controlling virtual network functions of said entity,
   wherein at least a subset of the first resource set provides the first virtual network function,
   and wherein another subset of the allocated first resource set or a second resource set allocated to said entity provides resources for said second virtual network function.

* * * * *